(12) United States Patent
Bowman et al.

(10) Patent No.: US 10,627,025 B2
(45) Date of Patent: Apr. 21, 2020

(54) SPRUNG COUPLING

(71) Applicant: Victaulic Company, Easton, PA (US)

(72) Inventors: Matthew A. Bowman, Palmer, PA (US); Philip Wayne Bancroft, Belvidere, NJ (US); Scott D. Madara, Nazareth, PA (US); Kathryn E. Yovanovich, Bethlehem, PA (US); Thomas C. Savage, Doylestown, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 16/413,737

(22) Filed: May 16, 2019

(65) Prior Publication Data

US 2019/0271423 A1 Sep. 5, 2019

Related U.S. Application Data

(63) Continuation of application No. 15/593,662, filed on May 12, 2017.

(60) Provisional application No. 62/336,879, filed on May 16, 2016, provisional application No. 62/336,885, filed on May 16, 2016.

(51) Int. Cl.
*F16L 17/04* (2006.01)
*F16L 21/08* (2006.01)
*F16L 37/091* (2006.01)
*F16L 21/06* (2006.01)

(52) U.S. Cl.
CPC .............. *F16L 17/04* (2013.01); *F16L 21/06* (2013.01); *F16L 21/08* (2013.01); *F16L 37/091* (2013.01); *F16L 2201/10* (2013.01)

(58) Field of Classification Search
CPC .......... F16L 21/06; F16L 17/04; F16L 37/091
USPC .................. 285/112, 373, 419, 420
See application file for complete search history.

(56) References Cited

U.S. PATENT DOCUMENTS

| 1,074,395 A | 9/1913 | Welch |
| 1,649,594 A | 11/1927 | Johnson |
| 2,021,081 A | 11/1935 | North |
| 2,041,132 A | 5/1936 | Johnson |
| 2,459,251 A | 1/1949 | Stillwagon |
| 3,213,187 A | 10/1965 | Kish |
| 3,788,677 A | 1/1974 | Stade et al. |

(Continued)

FOREIGN PATENT DOCUMENTS

| DE | 3111997 | 10/1982 |
| DE | 3443942 | 6/1985 |

(Continued)

*Primary Examiner* — Zachary T Dragicevich
(74) *Attorney, Agent, or Firm* — Ballard Spahr LLP

(57) ABSTRACT

A preassembled combination for connecting a captured pipe element to a second pipe element includes a plurality of segments attached to one another end to end to form a loop around a central space. A ring seal is positioned in channels defined by the segments. The captured pipe element has a first end positioned in the central space. The coupling is configured such that once the end of the second pipe element is inserted into the central space the segments can be drawn toward one another to join the second pipe element with the captured pipe element. A method of manufacturing the combination includes the steps of engaging a ring seal with a pipe element, positioning the ring seal in a channel of the segments and attaching the segments to one another.

39 Claims, 14 Drawing Sheets

(56) References Cited

U.S. PATENT DOCUMENTS

| | | |
|---|---|---|
| 3,794,360 A | 2/1974 | Bachle et al. |
| 3,967,837 A * | 7/1976 | Westerlund ............ F16L 17/04 285/112 |
| 4,273,367 A | 6/1981 | Keeney et al. |
| 4,443,029 A | 4/1984 | Laxo |
| 5,030,006 A | 7/1991 | Mitchell |
| 5,080,400 A | 1/1992 | Adamek |
| 5,782,499 A | 7/1998 | Gfrerer et al. |
| 5,813,437 A | 9/1998 | Esser |
| 5,941,576 A | 8/1999 | Krausz |
| 6,056,332 A | 5/2000 | Foster |
| 6,276,729 B1 | 8/2001 | Sanwald |
| 6,367,849 B1 | 4/2002 | Tatsuta et al. |
| 6,672,631 B1 | 1/2004 | Weinhold |
| 7,341,287 B2 | 3/2008 | Gibb et al. |
| 7,490,866 B2 | 2/2009 | Webb et al. |
| 7,837,239 B2 | 11/2010 | Krausz et al. |
| 8,827,214 B2 | 9/2014 | Ogawa |
| 9,890,884 B1 | 2/2018 | Chiproot |
| 9,976,677 B2 | 5/2018 | Lurk |
| 2005/0067538 A1 | 3/2005 | Stigler |
| 2009/0127846 A1 | 5/2009 | Dole et al. |
| 2012/0139236 A1* | 6/2012 | Novitsky ................ F16L 17/04 |
| 2013/0125373 A1* | 5/2013 | Bancroft ................. F16L 17/04 |
| 2013/0187379 A1* | 7/2013 | Beagen, Jr. ............ F16L 17/04 |
| 2014/0327238 A1 | 11/2014 | Bowman |
| 2015/0021911 A1 | 1/2015 | Bowman et al. |
| 2015/0176728 A1 | 6/2015 | Bowman |
| 2015/0204471 A1 | 7/2015 | Sato |
| 2016/0084420 A1 | 3/2016 | Barrientos |
| 2018/0163905 A1 | 6/2018 | Ohnemus et al. |
| 2018/0163906 A1 | 6/2018 | Ohnemus et al. |
| 2019/0032824 A1 | 1/2019 | McNamara et al. |
| 2019/0032825 A1 | 1/2019 | McNamara et al. |

FOREIGN PATENT DOCUMENTS

| | | |
|---|---|---|
| DE | 3443943 | 6/1985 |
| DE | 10006029 | 8/2001 |
| DE | 10006029 A1 | 8/2001 |
| EP | 1840439 | 6/2010 |
| EP | 2487397 | 8/2012 |
| FR | 2921985 | 3/2013 |
| JP | S5615891 U | 2/1981 |

\* cited by examiner

SPRUNG COUPLING

CROSS REFERENCE TO RELATED APPLICATIONS

This application is a continuation of and claims benefit of priority to U.S. patent application Ser. No. 15/593,662, filed May 12, 2017 which application is based upon and claims the benefit of priority to U.S. Provisional Application No. 62/336,879, filed May 16, 2016, and U.S. Provisional Application No. 62/336,885, filed May 16, 2016, all of these applications being hereby incorporated by reference.

FIELD OF THE INVENTION

This invention relates to mechanical pipe couplings for joining pipe elements.

BACKGROUND

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

Each mechanical coupling segment comprises a housing having projections which extend inwardly from the housing and engage, for example, the outer surfaces of pipe elements of various configurations including, for example, pipe elements having circumferential grooves. Engagement between the projections and the pipe elements provides mechanical restraint to the joint and ensures that the pipe elements remain coupled even under high internal pressure and external forces. The housings define an annular channel that receives a ring gasket or seal, typically an elastomeric ring which engages the ends of each pipe element and cooperates with the segments and the pipe elements to provide a fluid tight seal. The segments have connection members, typically in the form of lugs which project outwardly from the housings. The lugs are adapted to receive fasteners, such as nuts and bolts, which are adjustably tightenable to draw the segments toward one another.

Mechanical couplings for grooved pipe elements according to the prior art have continuous arcuate projections on the segments that engage the outer surfaces of the pipe elements which they are joining end to end. These arcuate projections are part of the segment structure commonly referred to as the "keys" of the coupling. The keys may engage the outer surface of pipe element in various configurations including, for example, pipe element having circumferential grooves.

The arcuate projections on prior art couplings for grooved pipe elements typically have arcuate surfaces with a radius of curvature that is marginally larger than the radius of curvature of the outer surface of the pipe element within the groove that it is intended to engage. For couplings used with grooved pipe elements, the radii of curvature of the arcuate surfaces are smaller than the radii of curvature of the outer surfaces of the pipe elements outside of the grooves so that the projections fit within and engage the grooves.

Methods of securing pipe elements in end to end relation comprise a sequential installation process when mechanical couplings according to the prior art are used. Typically, the coupling is received by the technician with the segments bolted together and the ring gasket captured within the segments' channels. The technician first disassembles the coupling by unbolting it, removes the ring gasket, lubricates it (if not pre-lubricated) and places it around the ends of the pipe elements to be joined. Installation of the ring gasket often requires that it be lubricated and stretched to accommodate the pipe elements. With the ring gasket in place on both pipe elements, the segments are then placed one at a time straddling the ends of the pipe elements and capturing the ring gasket against them. During placement, the segments engage the gasket, the projections are aligned with the grooves, the bolts are inserted through the lugs, the nuts are threaded onto the bolts and tightened, drawing the coupling segments toward one another, compressing the gasket and engaging the projections within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY

The invention concerns a preassembled combination for connecting a captured pipe element to a second pipe element. In one example embodiment the combination comprises a preassembled coupling comprising a plurality of segments attached to one another end to end to form a loop around a central space. Each of said segments comprises a first shoulder and a second shoulder. A channel is disposed between the first and second shoulders and faces the central space. The first and second shoulders project radially-inwardly toward the central space. A flexible, resilient ring seal is positioned in the channels. The ring seal comprises first and second lobes that each extend radially inwardly to define first and second ring inner seal surfaces, respectively. The captured pipe element comprises a first end disposed within the central space, a circumferentially extending sealing surface is aligned with the first ring inner seal surface, an annular groove, a pipe shoulder extending radially-outwardly, and a bead extending radially-outwardly and disposed within the central space. The annular groove, sealing surface, and bead are all axially disposed between first end and the pipe shoulder. The bead and sealing surface are both axially disposed between the annular groove and the first end, the bead extends radially outwardly farther than an inner radial extent of the first lobe, the coupling and bead are shaped and positioned such that the first end and bead are captured within the central space, the second shoulders of the plurality of segments are axially disposed between the bead and pipe shoulder and are aligned with the annular groove of the captured pipe element, the coupling is shaped and configured to permit an end of the second pipe element to be axially inserted into the central space, and the coupling is shaped and configured such that once the end of the second pipe element is properly inserted into the central space. The plurality of segments can be drawn toward one another and the central space and thereby cause (1) the first ring inner seal surface to sealingly engage the sealing surface of the captured pipe element, (2) the second ring inner seal surface to sealingly engage a sealing surface of the second pipe element, (3) the second shoulders to engage the groove of the captured pipe element, and (4) the first shoulders to engage an annular groove of the second pipe element, thereby joining the second pipe element with the captured pipe element.

By way of example the bead extends radially-outwardly from the sealing surface and the annular groove is axially disposed between the bead and pipe shoulder. The ring seal supports the segments in spaced apart relation sufficient to permit insertion of said second pipe element into the central space while the segments are attached to one another in the loop. Engagement between the bead and the first lobe creates interference which acts to limit movement of said captured pipe element in a first axial direction. The pipe shoulder extends radially-outwardly farther than an inner radial extent of the second shoulders of the segments. The sealing surface of the captured pipe element is positioned radially-outwardly farther than an annular bottom surface formed by the annular groove. The second ring inner seal surface has a diameter sized to receive said second pipe element upon insertion of the end of said second pipe element into the central space. The plurality of segments comprises no more than two said segments, and the coupling comprises a threaded fastener that connects a first of said plurality of segments to a second of said plurality of segments.

In an example embodiment the bead extends radially-outwardly from the sealing surface. Further by way of example the bead engages the first lobe. In an example embodiment the captured pipe element comprises a flexible hose. Further by way of example the bead is axially spaced from the first end of the captured pipe element. Again by way of example, the annular groove is axially disposed between the bead and pipe shoulder. Further by way of example the ring seal supports said segments in spaced apart relation sufficient to permit insertion of said second pipe element into said central space while said segments are attached to one another in the loop.

In an example embodiment, engagement between the bead and the first lobe creates interference which acts to limit movement of said captured pipe element in a first axial direction. In a further example, the first axial direction is a direction by which the captured pipe element moves further into the central space. In an example, the sealing surface of the captured pipe element is positioned radially-outwardly farther than an annular bottom surface formed by the annular groove. By way of example, the pipe shoulder extends radially-outwardly farther than an inner radial extent of the second shoulders of the segments. In an example embodiment the pipe shoulder is axially adjacent to annular groove and the second shoulders of the segments and limits an extent to which the first end of the captured pipe element can extend axially into the central space.

In an example embodiment the plurality of segments comprises no more than two said segments, and the coupling comprises a threaded fastener that connects a first of said plurality of segments to a second of said plurality of segments. An example is furthermore provided in combination with the second pipe element, wherein the end of the second pipe element is disposed within the central space. By way of example the bead is axially disposed between the sealing surface of the captured pipe element and the groove of the captured pipe element. Further by way of example the bead extends radially outwardly farther than an inner radial extent of the second shoulders such that the second shoulders capture the bead within the central space.

The invention further encompasses a method of manufacturing an example combination according to the invention. One example method embodiment comprises, sequentially:

engaging the ring seal with a pipe element that will become the captured pipe element such that (1) interference between the bead and the first lobe impedes movement of said captured pipe element relative to the ring seal in a first axial direction, and (2) first ring inner seal surface is axially aligned with the sealing surface of the captured pipe element;

positioning the ring seal in the channel of at least one of the plurality of segments; and attaching the plurality of segments to one another end to end to form the loop around the central space, thereby forming the preassembled coupling and capturing the captured pipe element within the central space to form the combination.

In one example embodiment, attaching comprises partially tightening a threaded fastener that extends between two of the plurality of segments. In an example embodiment the attaching causes the ring seal to support said segments in spaced apart relation sufficient to permit insertion of the end of the second pipe element into said central space while said segments are attached to one another in the loop.

A further example method embodiment comprises axially inserting the end of the second pipe element into the central space while the coupling is preassembled and the first end of the captured pipe element is captured within the central space, and while the end of the second pipe element is inserted into the central space, drawing the plurality of segments toward one another and the central space, thereby causing (1) the first ring inner seal surface to sealingly engage the sealing surface of the captured pipe element, (2) the second ring inner seal surface to sealingly engage the sealing surface of the second pipe element, (3) the second shoulders to engage the groove of the captured pipe element, and (4) the first shoulders to engage the annular groove of the second pipe element, thereby joining the second pipe element with the captured pipe element.

In an example method, drawing comprises tightening a threaded fastener that extends between two of the plurality of segments. By way of example the sealing surface of the second pipe element is the radially-outwardmost surface of the second pipe element between the annular groove of the second pipe element and the end of the second pipe element.

Further by way of example, an outer surface of the second pipe is disposed on an opposite side of the annular groove from the sealing surface of the second pipe extends radially-outwardly farther than the sealing surface of the second pipe. In an example method embodiment, after the drawing, the sealing surface of the second pipe element defines a radially-outwardmost surface of the portion of the second pipe element disposed within the central space. By way of example the bead of the captured pipe element is positioned radially outwardly farther than the sealing surface of the second pipe element.

In a further example method, after the drawing, a portion of the captured pipe element disposed in the central space extends radially outwardly farther than a portion of the second pipe element disposed in the central space. Additionally by way of example, after the drawing, the bead causes a shape of a portion of the captured pipe element disposed within the central space to be different from a shape of a portion of the second pipe element disposed within the central space.

In an example method, the sealing surface of the second pipe element extends continuously to the end of the second pipe element. By way of example, the sealing surface of the second pipe element extends continuously from the annular groove of the second pipe element to the end of the second pipe element. In an example embodiment of one method according to the invention the sealing surface of the second pipe is axially disposed between the annular groove of the second pipe and the end of the second pipe, and the annular groove of the second pipe element is axially adjacent the sealing surface of the second pipe element, and the sealing surface of the second pipe element is axially adjacent the end of the second pipe element.

DETAILED DESCRIPTION

Figure 1:
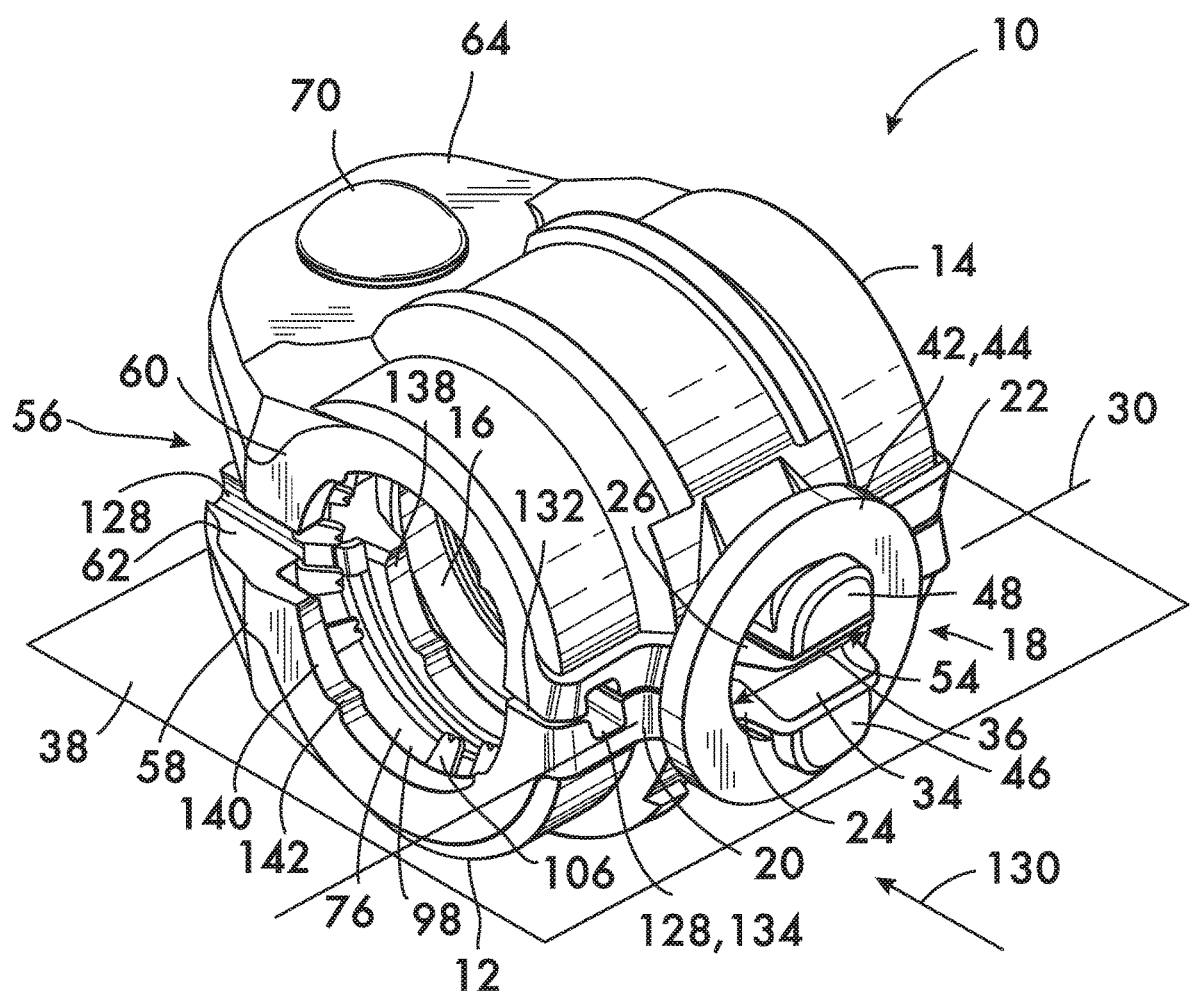
FIG. 1 is an isometric view of an example embodiment of a pipe coupling according to the invention.
Figure 1A:
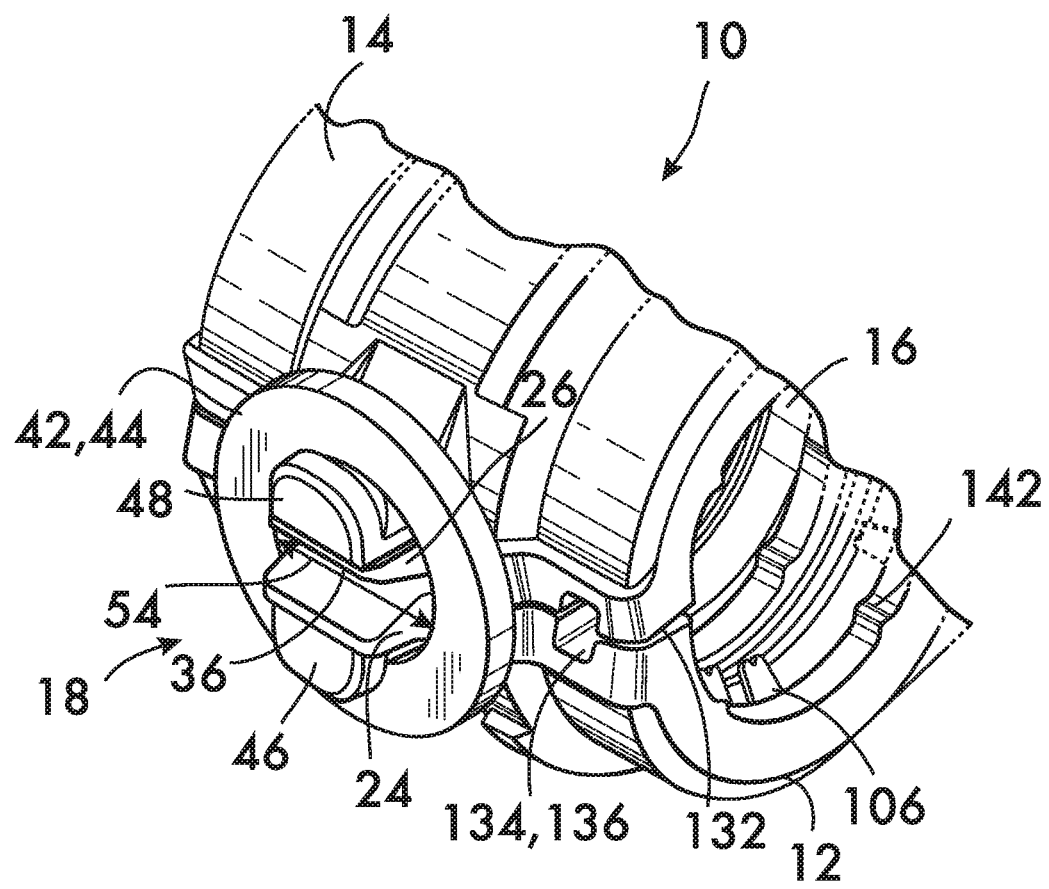
FIG. 1A is an isometric view of a portion of the example pipe coupling shown in FIG. 1.

An example embodiment of a coupling 10 according to the invention is shown in FIGS. 1 and 1A. Coupling 10 is for joining pipe elements and comprises first and second segments 12 and 14 positioned end to end surrounding a central space 16 for receiving the pipe elements. A spring assembly 18 joins a first end 20 of first segment 12 to a first end 22 of the second segment 14. The spring assembly 18 biases the segments 12 and 14 away from one another toward or into an open, pre-assembled state shown. When in this open or pre-assembled state, pipe elements can be inserted into the central space 16 without disassembling the coupling 10 as described below.

Figure 2:
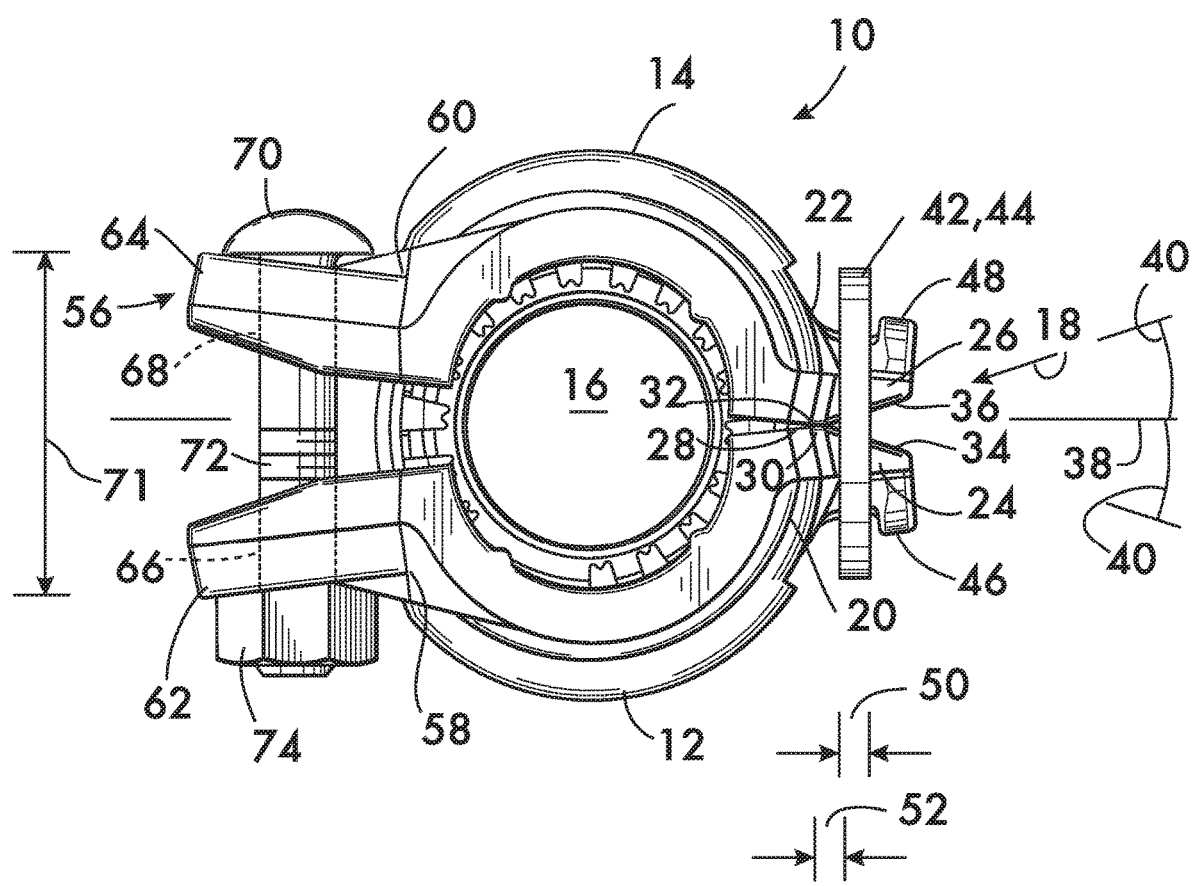
FIG. 2 is an axial view of the example pipe coupling shown in FIG. 1.

The example spring assembly 18 shown in FIGS. 1 and 2 comprises a first boss 24 projecting from the first end 20 of the first segment 12, and a second boss 26 projecting from the second end 22 of the second segment 14. The second boss 26 is positioned adjacent to the first boss 24. Bosses 24 and 26 are cantilevers and thus are substantially responsible for the biasing force of the spring assembly 18 as described below. A first fulcrum 28 is positioned on the first boss 24, the first fulcrum 28 contacting the second boss 26 and providing an axis 30 about which the segments 12 and 14 may pivot. In this example embodiment a second fulcrum 32 is positioned on the second boss 26. The second fulcrum 32 contacts the first fulcrum 28 to further define the pivot axis 30 about which the segments 12 and 14 pivot. First and second fulcrums 28 and 32 are defined in this example embodiment by first and second lands 34 and 36. The first and second lands 34 and 36 are respectively positioned on the first and second bosses 24 and 26, the first land 34 being contiguous with the first fulcrum 28, and the second land 36 being contiguous with the second fulcrum 32 (when present). At least the first land 34 is oriented angularly with respect to a plane 38 comprising the interface between the first and second segments 12 and 14. In this example embodiment both the first and second lands 34 and 36 are angularly oriented with respective orientation angles 40.

A link 42 extends between the first and second bosses 24 and 26. Link 42 captures the bosses, while permitting pivoting motion of the segments 12 and 14. In this example the link 42 comprises a ring 44 which encircles the first and second bosses 24 and 26. Ring 44 is retained on the bosses 24 and 26 by engagement with first and second heads 46 and 48 respectively projecting from the first and second bosses 24 and 26. Ring 44 and the bosses 24 and 26 cooperate to provide the spring biasing action of the spring assembly 18. The thickness 50 of the ring 44, the distance 52 between the fulcrums 28 and 32 and the point where the bosses 24 and 26 engage the ring 44, along with the area moment of inertia of the bosses, are parameters which will establish the spring constant of the spring assembly 18 and thus determine the amount of force necessary to close the coupling 10 and effect a joint. The angular orientation 40 of the lands 34 and 36 and the distance the fastener 70 has been tightened each act to set the maximum limit of separation between the segments 12 and 14, and the inner diameter 54 of the ring 44 determines the minimum separation of the segments when supported by an undeformed spring assembly 18 as shown in FIGS. 1 and 2. In one embodiment, the angular orientation 40 is such that, if the fastener 70 is not present (such as during the assembly of the coupling by the manufacturer) bosses 24, 26 may be brought near enough together that the inner diameter 54 of ring 44 will clear heads 46, 48, allowing ring 44 to be easily assembled over bosses 24, 26. Subsequent assembly and tightening of fastener 70 to a pre-determined distance 71 (see FIG. 2) acts to separate heads 46, 48 sufficient to retain ring 44 behind heads 46 and 58 as described above. The ring inner diameter 54 may be sized to hold the segments 12 and 14 in the open or pre-assembled state sufficient to permit insertion of pipe elements into the central space 16, or the diameter 54 may be larger, and permit the segments 12 and 14 to be supported in the open or pre-assembled state by other elements of the coupling as described below. In this situation the segments 12 and 14 will have some angular free play as the segments are drawn toward one another to close the coupling, the spring assembly 18 not immediately coming into effect upon pivoting of the segments.

Segments 12 and 14 are drawn toward one another by an adjustable attachment assembly 56. Attachment assembly 56 joins the second end 58 of the first segment 12 to the second end 60 of the second segment 14. Attachment assembly 56 is adapted to draw the segments 12 and 14 toward one another and into engagement with the pipe elements as described below. In this example the adjustable attachment assembly 56 comprises a first lug 62 attached to the second end 58 of the first segment 12, and a second lug 64 attached to the second end 60 of the second segment 14. Each lug 62, 64 defines a respective hole 66, 68 which receive a fastener 70 that extends between the lugs. In this example fastener 70 comprises a bolt 72 and a nut 74, which, when tightened, draw the segments 12 and 14 toward one another against the biasing force of the spring assembly 18.

Figure 3:
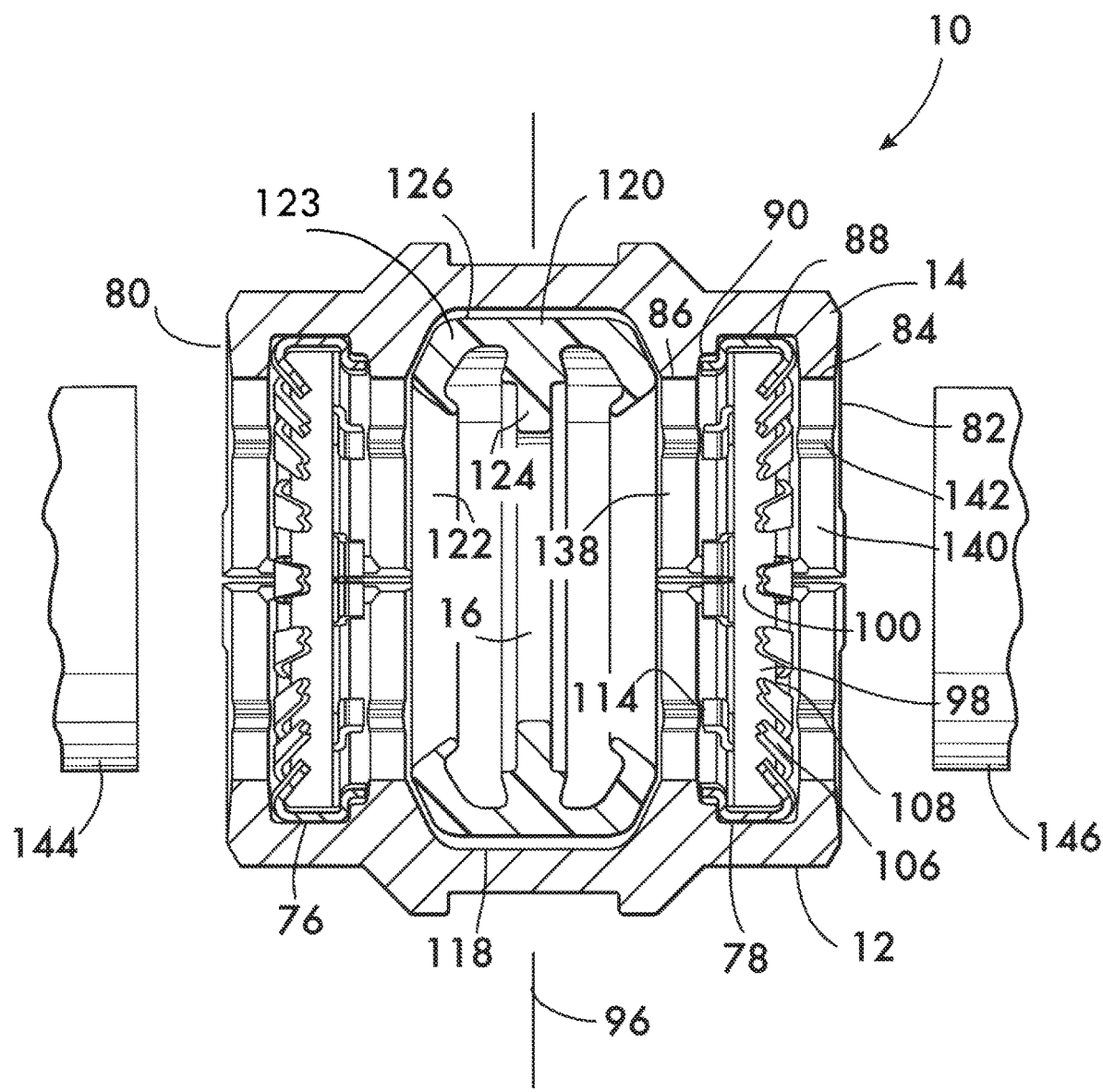
FIG. 3 is a sectional view of the example pipe coupling shown in FIG. 1.
Figure 4:
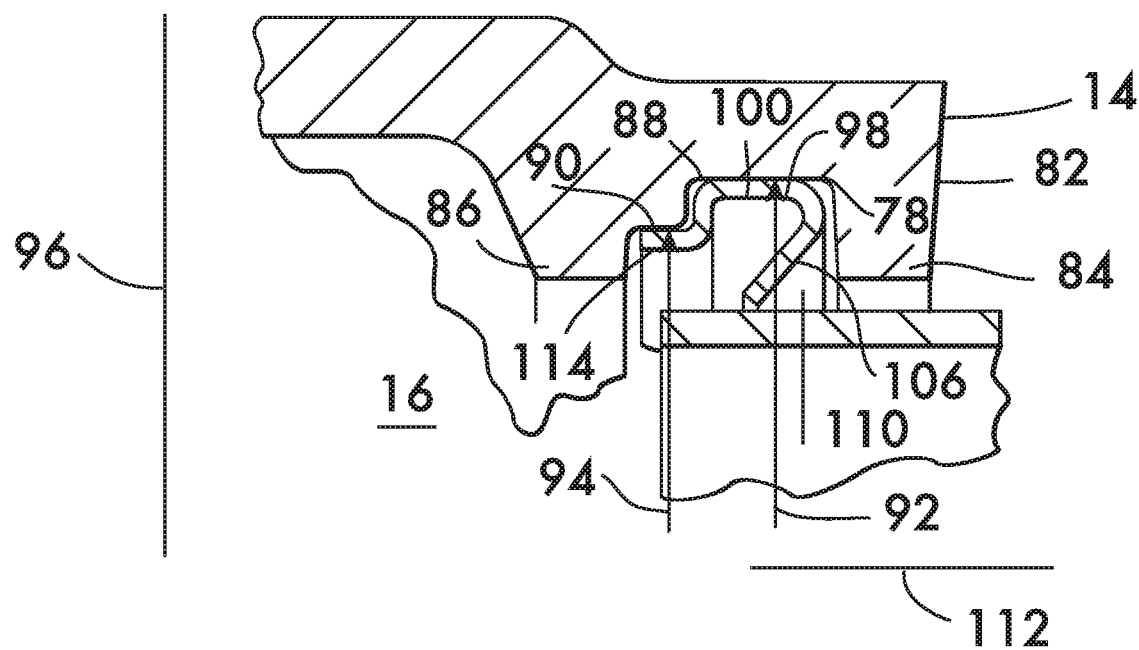
FIG. 4 is a partial sectional view of the example pipe coupling shown in FIG. 1.

As shown in cross section in FIG. 3, each segment 12 and 14 comprises first and second channels 76 and 78 respectively positioned on opposite sides 80 and 82 of each segment. The first and second channels 76 and 78 extend between the first and second ends 20 and 58 of the first segment 12, and the first and second ends 22 and 60 of the second segment 14 (see also FIG. 1). Channels 76 and 78 face the central space 16. As shown in detail in FIG. 4, each channel 76, 78 (channel 78 in segment 14 being shown) is defined by sidewalls 84 and 86 positioned in spaced relation to one another. Each channel 76, 78 furthermore has first and second floors 88 and 90 located between sidewalls 84 and 86. Floors 88 and 90 face the central space 16 and are arcuate in shape as they extend between the ends 20 and 58 and 22 and 60 of the segments 12 and 14. As shown in FIG. 4, first floor 88 is positioned closer to the side 82 of segment 14 and has a greater radius of curvature 92 than the second floor 90, which has a radius of curvature 94. As shown in FIG. 3, the channels 76 and 78 and the arrangement of their floors 88 and 90 are symmetric about an axis 96 extending transversely through the coupling 10.

As further shown in FIGS. 3 and 4, the channels 76 and 78 each receive a respective retainer 98. Retainer 98 is shown in detail in FIG. 5 and comprises an arcuate band 100 having oppositely disposed ends 102 and 104. Band 100 thus forms a "split ring" which, when compressed radially will deform to a smaller radius of curvature (see FIG. 7). In some embodiments, each band 100 is sized such that contact between bands 100 and the respective segments 12 and 14 within channels 76 and 78 allow one or both bands 100 to support segments 12 and 14 in spaced apart relation as shown in FIG. 1. A plurality of teeth 106 are positioned along one edge 108 of band 78. Teeth 106 project from band 100 toward the central space 16. As shown in FIGS. 3 and 4, teeth 106 are oriented angularly toward axis 96 with respect to a line 110 extending radially from an axis 112 arranged coaxially with the central space 16. The angular orientation is advantageous for retaining pipe elements as described below.

Figure 6:
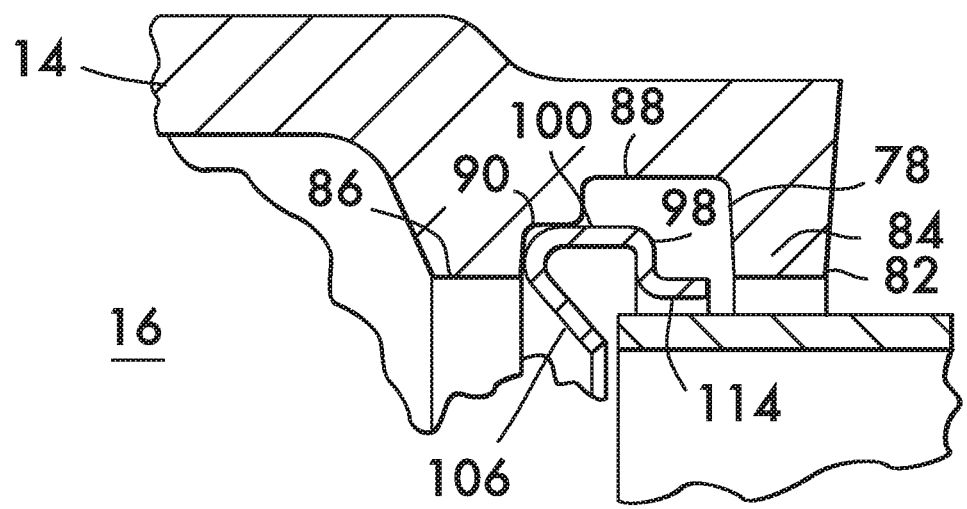
FIG. 6 is a partial sectional view of the example pipe coupling shown in FIG. 1.
Figure 5:
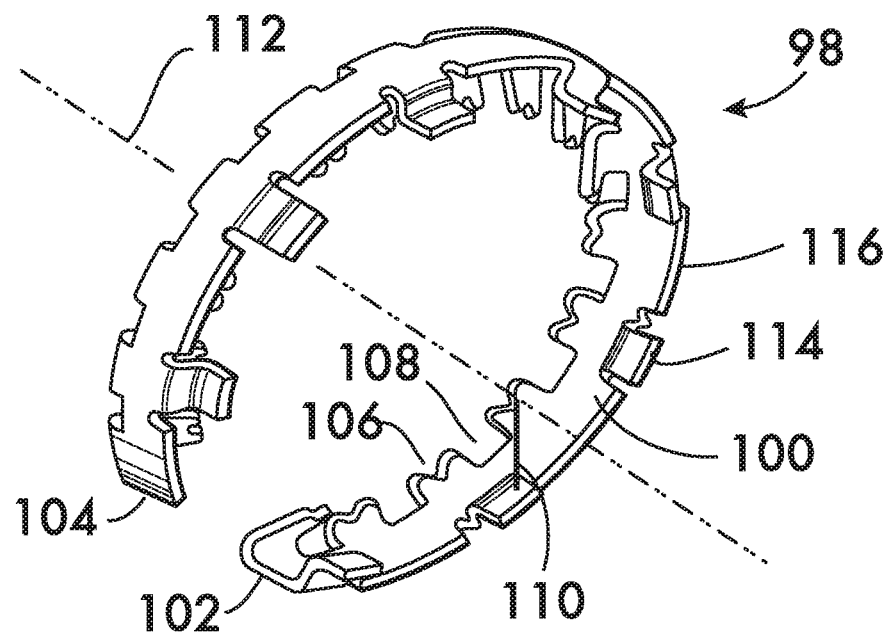
FIG. 5 is an isometric view of a component used in an example coupling.

As shown in FIG. 5, at least one, but in this example embodiment, a plurality of tabs 114 are positioned along an edge 116 oppositely disposed from edge 108. As shown in FIG. 4, the one or more tabs 114 are oriented substantially perpendicular to the line 110 and are offset from the band 100 toward axis 112 arranged coaxially with the central space 16. This offset of tabs 114 permits them to overlie the second floor 90, and the band 100 to overlie the first floor 88, when retainers 98 are properly received within respective channels 76 and 78 as shown in FIGS. 3 and 4. Proper assembly of the retainers 98 within the channels 76 and 78 permits pipe elements to be inserted into a pre-assembled coupling 10 as described below. However, as shown in FIG. 6, the channels 76 and 78 (78 shown) and the retainers 98 are sized such that if the coupling 10 is improperly assembled with the band 100 overlying the second floor 90 and the tab or tabs 114 overlying the first floor 88, the retainer's radius of curvature is smaller and teeth 106 effectively prevent insertion of the pipe element into the central space 16 with the segments 12 and 14 in spaced apart relation in the pre-assembled state. This cooperation between the retainer 98, its tabs 114, teeth 106, and the first and second floors 88 and 90 of channels 76 and 78 prevent improper assembly of a pipe joint using coupling 10. If the pipe elements could be inserted with the retainer teeth 106 facing in the wrong direction (FIG. 6) then the teeth will not be self-actuating against forces which would draw or push the pipe element out of the coupling. Thus the retainer would provide reduced mechanical restraint.

As shown in FIG. 3, segments 12 and 14 further comprise a third channel 118. Channel 118 is positioned between the first and second channels 76 and 78 and faces the central space 16. Channel 118 receives a ring seal 120 which ensures a fluid tight joint. Ring seal 120 is formed of a flexible, resilient material such as EPDM or other rubber compounds and has inner surfaces 122 sized to receive pipe elements when they are inserted into the central space 16 as described below. Inner seal surfaces 122 are positioned on respective first and second lobes 123 which extend radially inwardly toward the central space 16. A pipe stop 124 is positioned between inner surfaces 122. The pipe stop projects into the central space 16 and limits insertion of pipe elements by engaging the pipe elements when they are inserted into coupling 10 to the desired depth. Ring seal 120 also has an outer surface 126 that may be sized to engage and support the segments 12 and 14 in spaced apart relation as shown in FIGS. 1 and 3. One or more of the bands 100 may also cooperate with the ring seal 120 to support the segments 12 and 14 in spaced apart relation. The separation of the segments 12 and 14, when supported by the ring seal 120 and/or band or bands 100, is sufficient to permit pipe elements to be inserted into the coupling when it is in its pre-assembled state (FIGS. 1, 2 and 3). FIG. 3 shows an example channel configuration wherein the second floors 90 are positioned between the first floors 88 and the third channel 118. In this example the tabs 114 project toward the third channel 118 when the retainers 98 are properly oriented within the coupling 10.

As shown in FIG. 1, coupling 10 further comprises a first aperture 128 in segment 12. In this example embodiment aperture 128 is aligned with the first channel 76 and provides a line of sight 130 toward the central space 16. In this example embodiment, aperture 128 is positioned at the interface 132 between segments 12 and 14 and is formed as a trough 134 in both segments 12 and 14. The troughs 134 in each of the segments 12 and 14 are aligned so that when the segments are drawn into engagement they provide a view toward the central space 16 to permit visual confirmation that the retainer is present and that a pipe element is present within the central space and seated at least past the retainer. As shown in FIG. 1A, a second aperture 136 is also positioned in at least one of the segments 12 and 14. The second aperture 136 is aligned with the second channel 78 in this embodiment (see FIG. 3) and also provides a line of sight toward central space 16. Again, in the example embodiment 10 illustrated, the second aperture 136 is positioned between the segments 12 and 14. Aperture 136 is also formed by troughs 134 at the interface 132 between the segments 12 and 14. The second aperture also permits visual confirmation that a pipe element is present within the central space 16.

As shown in FIGS. 1 and 3, each segment 12 and 14 also comprises first and second arcuate surfaces 138 and 140 respectively positioned on sidewalls 84 and 86. Arcuate surfaces 138 and 140 face the central space 16 and a plurality of projections 142 may be positioned on each arcuate surface 138, 140. Projections 142 are arranged in spaced relation to one another along the arcuate surfaces 138 and 140 and project toward the central space 16. As described below, projections 142 engage the pipe elements and increase joint stiffness and accommodate a wider tolerance range on the pipe outer diameter.

When projections 142 are forced into engagement with the pipe elements as the segments 12 and 14 are drawn toward one another they add stiffness to the joint between the coupling 10 and the pipe elements upon their engagement with the outer surfaces of the pipe elements. Additionally, the projections 142 allow the coupling 10 to accommodate a larger pipe outer diameter tolerance in combination with known manufacturing tolerances for coupling 10. When the outer diameter of pipe elements is near the small end of the tolerance range the presence of the projections 142 ensures mechanical engagement between the coupling 10 and the pipe elements. However, when the pipe diameter is at the large end of the tolerance range the projections will tend to deform the outer surface of the pipe elements locally, and projections 142 may also deform. For couplings 10 used with plain end pipe elements this is particularly advantageous as plain end couplings are typically designed so that the arcuate surfaces 138, 140 (see FIG. 3) do not engage the outer surfaces of the pipe elements. This arrangement ensures that the clamping force provided by the fastener 70 (see FIG. 2) is fully applied to the retainers 98. Were the arcuate surfaces 138, 140 of the coupling 10 to engage the pipe outer surface directly, the clamping force would be divided between contact of the arcuate surfaces with the pipe and contact between the retainers 98 and the pipe elements. Because the surface areas of projections 142 are small relative to the arcuate surfaces 138, 140, and contact the pipe element outer surface only at discrete points, only minimal clamping force from the fastener 70 needs to be diverted into contact between the projections 142 and the pipe elements to provide enhanced stiffness without compromising the axial retention provided by the retainers 98. Projections 142 are advantageous in that they achieve greater rigidity even with the lesser clamping force available with the single fastener design of the coupling 10. The single fastener 70 acts in conjunction with the spring assembly 18 to ensure that adequate clamping force is applied to the pipe elements.

Figure 8:
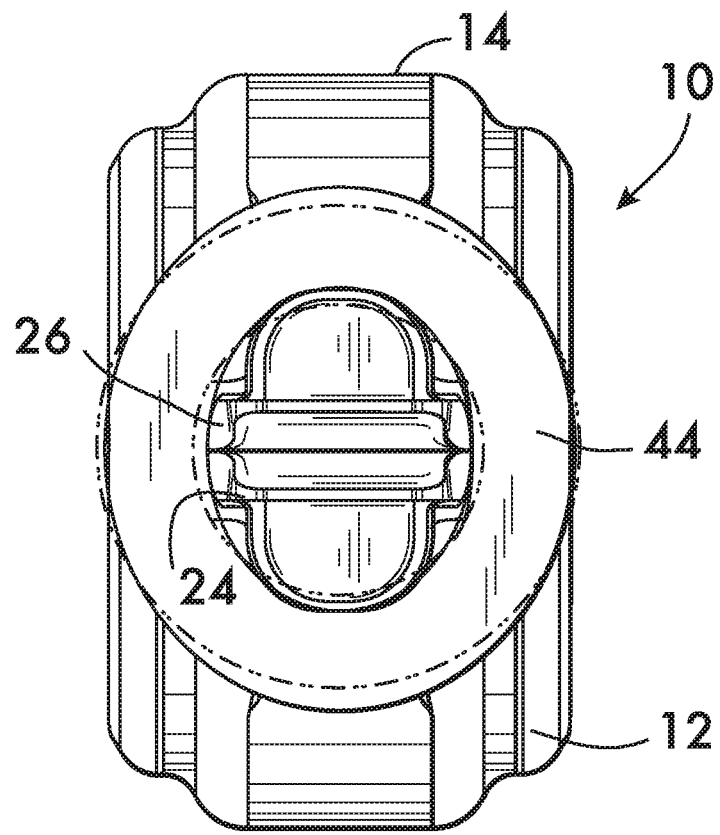
FIG. 8 is an end view of the example pipe coupling shown in FIG. 1.
Figure 7:
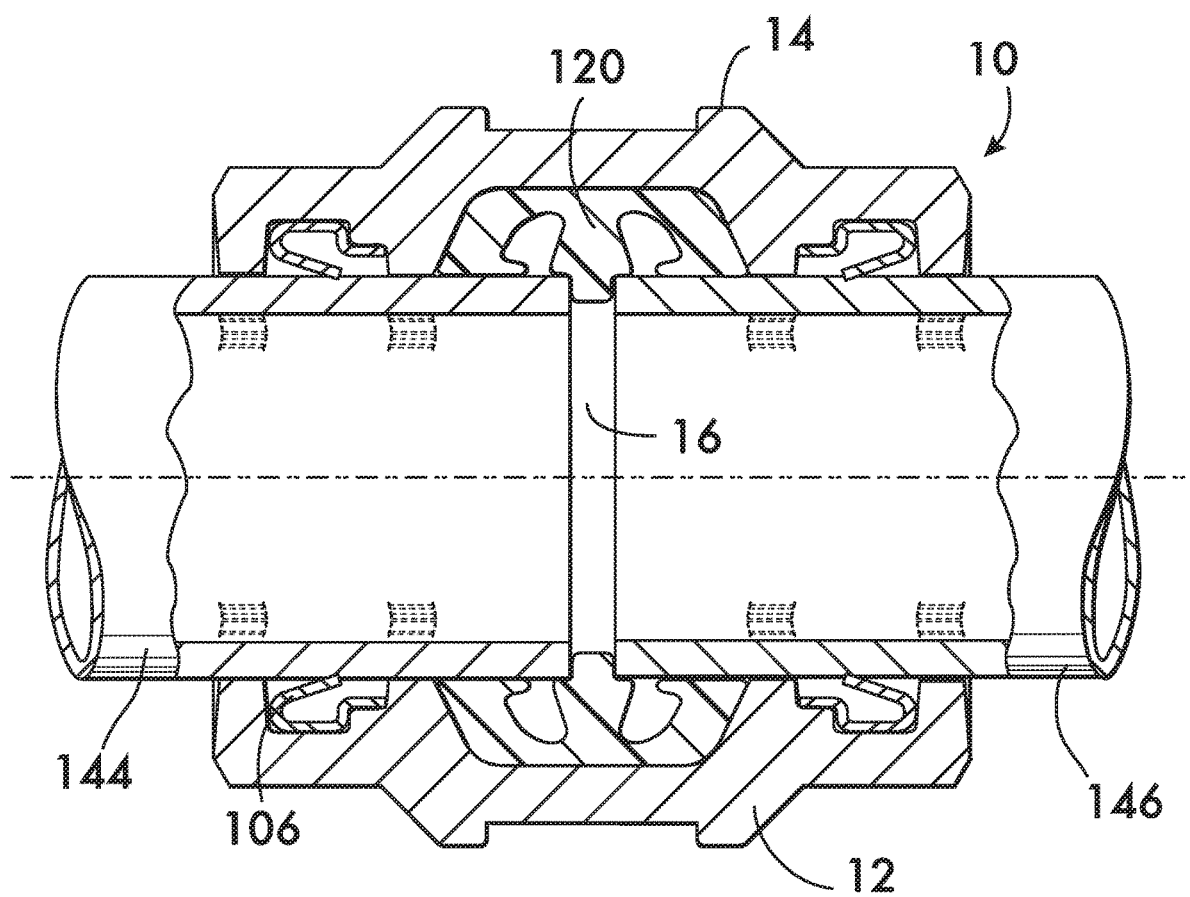
FIG. 7 is a sectional view of the example pipe coupling shown in FIG. 1.

Operation of coupling 10 is illustrated in FIGS. 1, 3, 7 and 8. With the coupling 10 in the pre-assembled state as shown in FIGS. 1 and 3, pipe elements 144 and 146 are inserted into the central space 16. The pipe elements clear the teeth 106 of retainers 98, engage and the inner surfaces 122 of ring seal 120, and engage the pipe stop 124. Next, the fastener 70 is tightened (see also FIG. 2) drawing the segments 12 and 14 toward one another. As shown in FIG. 7 the ring seal 120 and the teeth 106 are compressed between the segments 12 and 14 and the pipe elements 144 and 146. Pivoting motion of the segments about fulcrums 28 and 32 (see FIG. 2) is resisted by the biasing force of the spring assembly 18. As shown in FIG. 8, the elements comprising the spring assembly, in this example, the bosses 24 and 26 and the ring 44, deform in proportion to the spring force, with the ring 44 extending into an oval shape and the bosses 24 and 26 bending as cantilevers (deformed shapes shown in solid line, undeformed in broken line). Apertures 128, 136 may be used to visually confirm that the pipe elements are present in the coupling 10.

Figure 9:
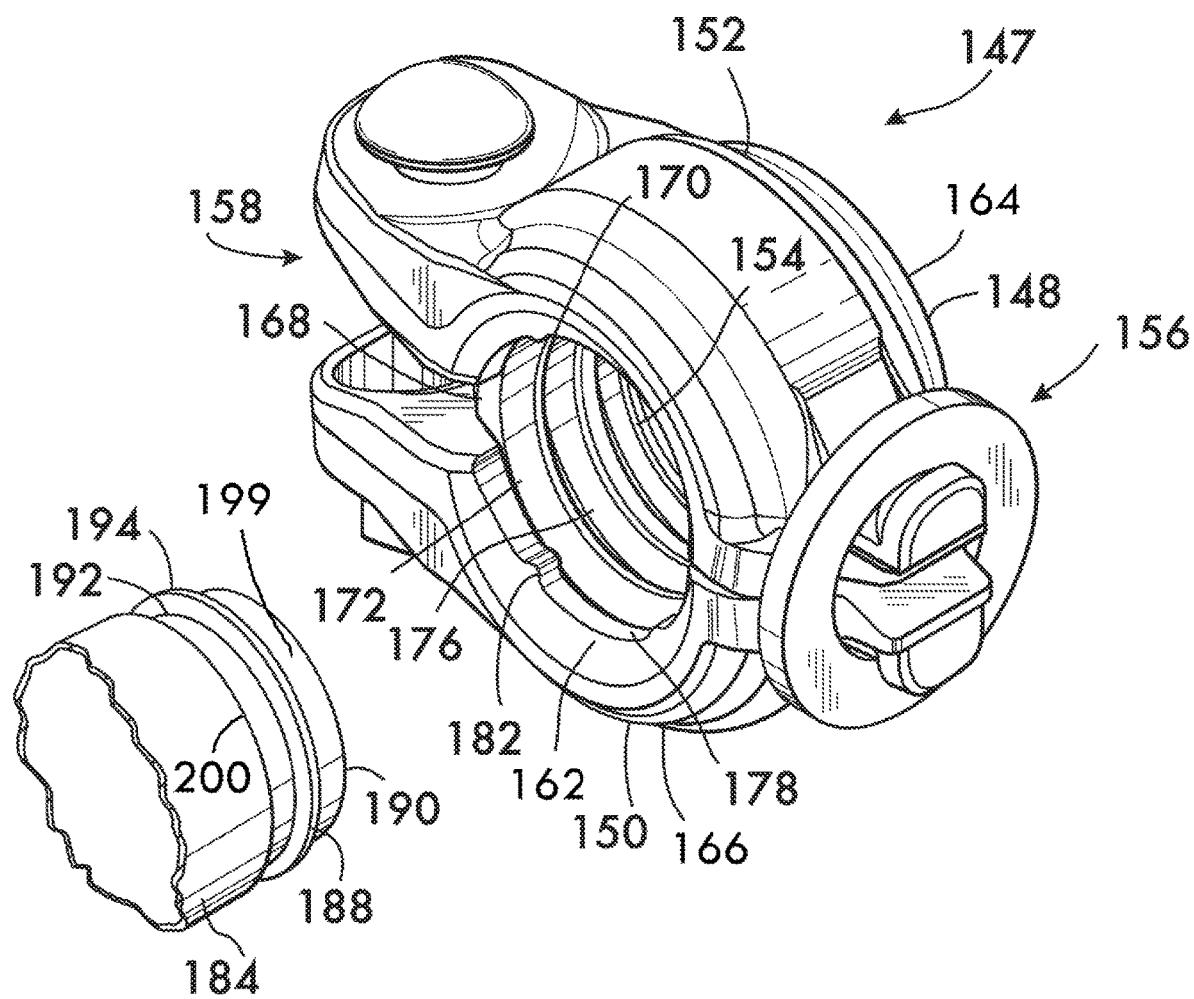
FIG. 9 is an exploded isometric view of an example preassembled combination coupling and pipe element according to the invention.
Figure 9A:
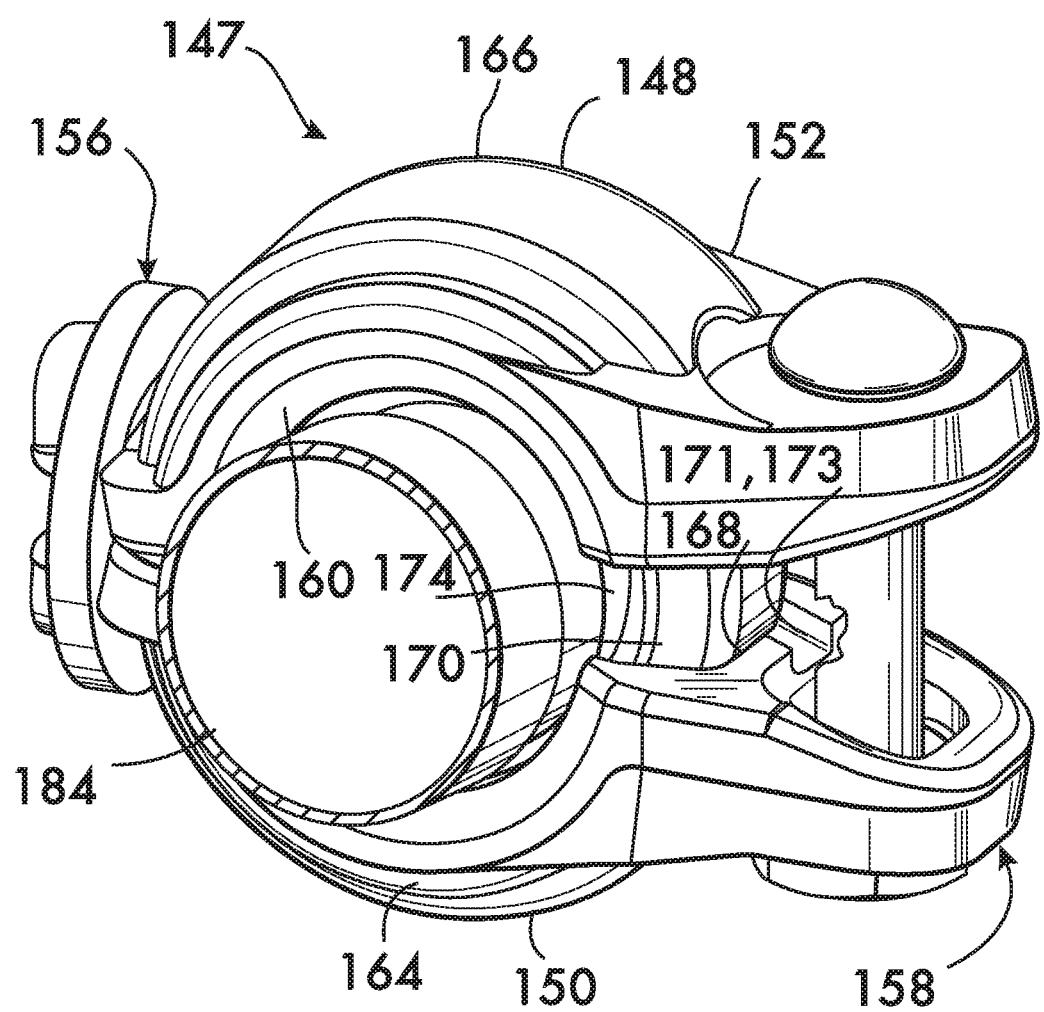
FIG. 9A is an isometric view of the example combination of FIG. 9 shown in a preassembled state.

FIG. 9 shows an exploded view, and FIG. 9A shows an assembled view, of a preassembled combination coupling and pipe element 147 according to the invention. The combination coupling and pipe element 147 comprises a coupling 148 and a first pipe element 184, and is used to couple a second pipe element 186 to the first pipe element (see FIGS. 10 and 11). The second pipe element 186 may, for example, be part of a piping network (not shown), and the first pipe element 184 may be part of another assembly, such as a flexible hose for a fire suppression sprinkler, or an inlet or and outlet of a pump or a valve to cite a few examples.

The coupling 148 comprises first and second segments 150 and 152 positioned end to end surrounding a central space 154 for receiving pipe elements. A spring assembly 156 and an adjustable attachment assembly 158, as described above for coupling 10, join the ends of the segments. Coupling 148 further comprises first and second shoulders 160 and 162 (see also FIG. 10) positioned on opposite sides 164, 166 of each segment 150 and 152. Shoulders 160 and 162 extend lengthwise along the segments 150 and 152 and project toward the central space 154. Shoulders 160 and 162 define a channel 168 which extends between the ends of the segments 150 and 152 and faces central space 154. Channel 168 receives a ring seal 170 for a fluid tight joint. Ring seal 170 has an inner surface 172 sized to receive pipe elements (see also FIG. 10) and an outer surface 174 which may be sized to support the segments 150 and 152 in the preassembled state, i.e., in spaced relation sufficient to insert the second pipe element 186 into the central space 154 without disassembling the combination 147. FIG. 9A shows the coupling in the preassembled state with the segments 150 and 152 in spaced relation. As described above for coupling 10, the spring assembly 156 may also be used to bias the segments 150 and 152 into the open, preassembled state shown in FIG. 9A. Ring seal 170 may also comprise a pipe stop 176 positioned between the inner surfaces 172. Pipe elements inserted into the central space engage the pipe stop 176 when properly seated (see FIG. 11).

Figure 10:
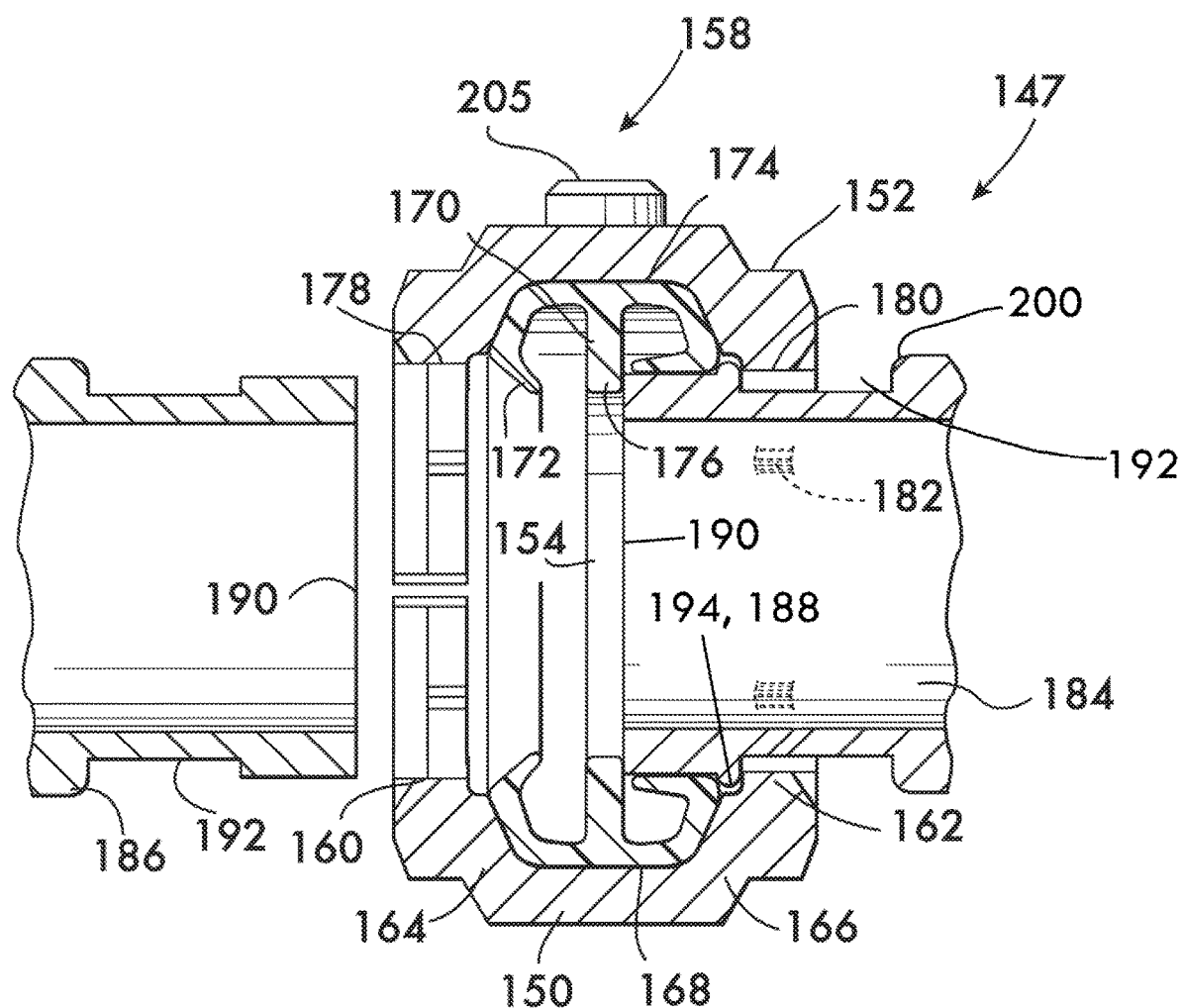
FIGS. 10 and 11 are sectional views of the example combination shown in FIG. 9 illustrating assembly of a pipe joint.

As shown in FIGS. 9 and 10, each segment 150 and 152 further comprises a first arcuate surface 178 positioned on the first shoulder 160 and a second arcuate surface 180 positioned on the second shoulder 162. Arcuate surfaces 178 and 180 face the central space 154. A plurality of projections 182 may be positioned on the arcuate surfaces 178 and 180. Projections 182 are arranged in spaced relation to one another along the arcuate surfaces 178 and 180 and project toward the central space 154. Projections 182 engage the pipe elements and increase joint stiffness and accommodate a wider tolerance range on the pipe outer diameter. As shown in FIG. 9A, the coupling 148 may have at least one aperture 171 in one of the segments 150, 152. In this example the aperture 171 comprises a trough 173 positioned at an interface between the first and second segments 150 and 152.

Figure 9B:
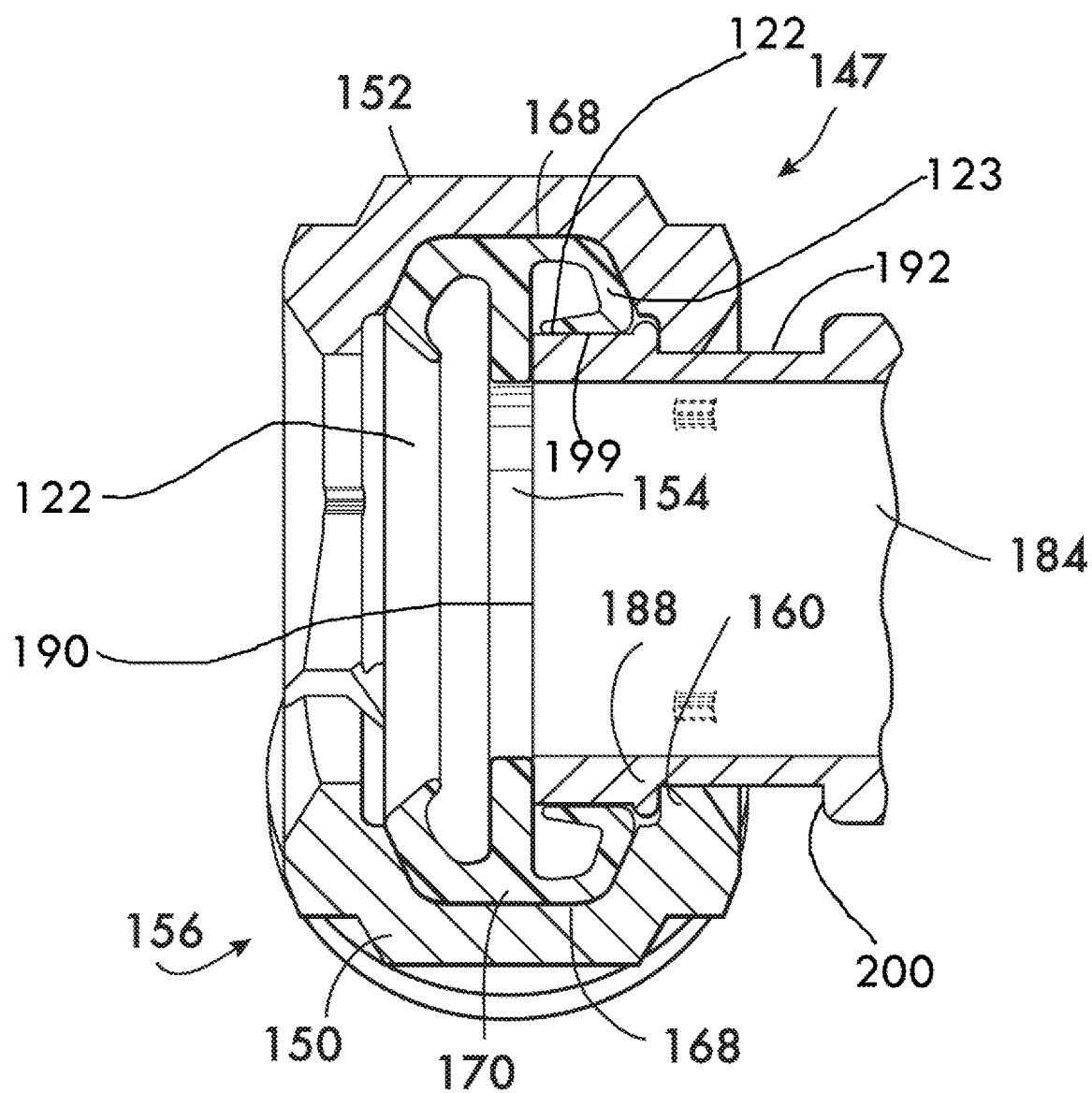
FIG. 9B is a sectional view of the example combination shown in FIG. 9.

As shown in FIG. 9, the first pipe element 184 comprises a rim 188 which projects outwardly from the first pipe element and extends circumferentially around. Rim 188 is positioned in spaced relation to an end 190 of the first pipe element 184, and as shown in FIGS. 9A and 10, is captured within the central space 154 by engagement with the shoulder 162. Pipe element 184 may thus be considered a captured pipe element. Rim 188 may be defined by a circumferential (annular) groove 192 in the first pipe element 184, or a circumferential bead 194 which projects radially outwardly from the first pipe element 184. In the example embodiment shown in FIG. 9, the rim 188 is defined by both the groove 192 and the bead 194. As shown in FIGS. 9 and 9B the captured pipe element 184 further comprises a circumferentially extending sealing surface 199. As shown in FIGS. 9, 9B and 10, a pipe shoulder 200 extends radially-outwardly from pipe element 184. In an example embodiment the annular groove 192, sealing surface 199, and bead 194 are all axially disposed between the first end 190 and the pipe shoulder 200. Further by way of example, the second shoulders 162 of the plurality of segments 150, 152 are axially disposed between the bead 194 and pipe shoulder 200 and are aligned with the annular groove 192 of the captured pipe element 184. The annular groove 192 is furthermore axially disposed between the bead 194 and pipe shoulder 200 in this example, and the pipe shoulder 200 extends radially-outwardly farther than an inner radial extent of the second shoulders 162 of the segments 150, 152. The pipe shoulder 200 is axially adjacent to the annular groove 192 and the second shoulders 162 of the segments 150, 152 and limits an extent to which the first end 190 of the captured pipe element 184 can extend axially into the central space 154.

Figure 9C:
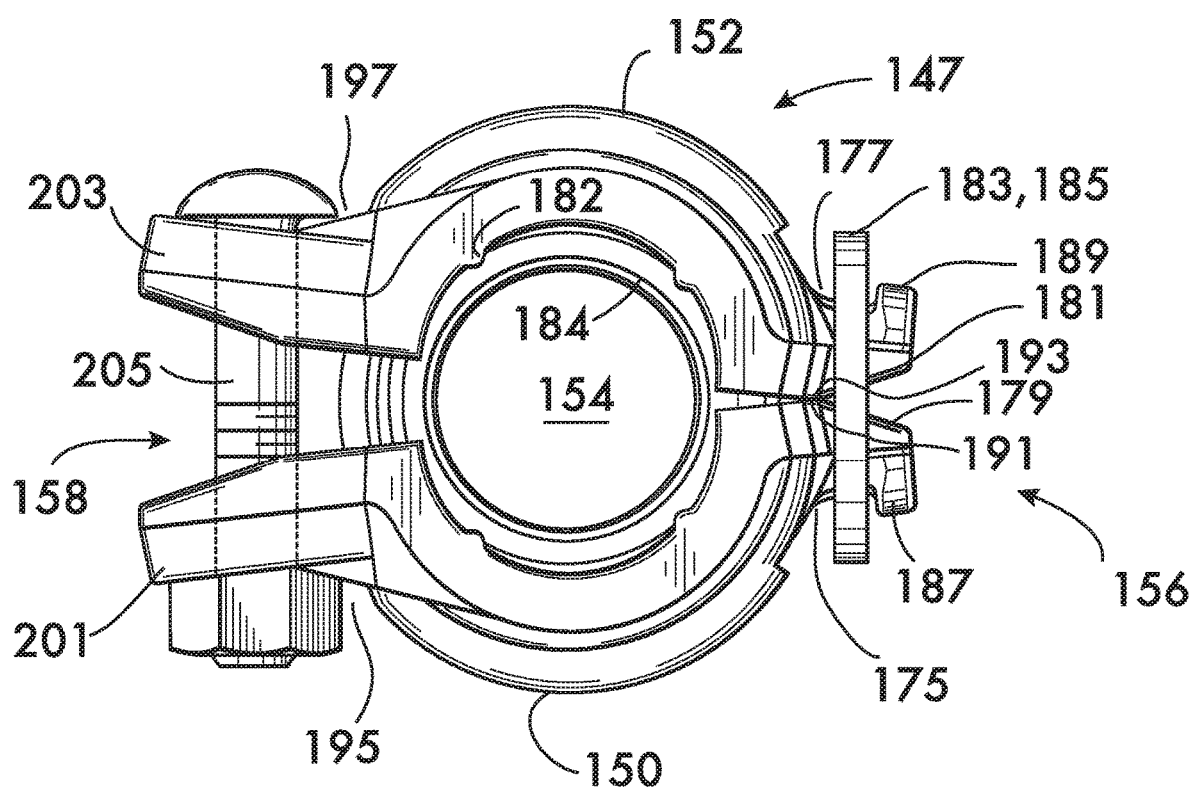
FIG. 9C is an axial view of the example combination shown in FIG. 9.

The preassembled combination coupling and pipe element 147 shown in FIG. 9A in its preassembled state is assembled as illustrated in FIGS. 9B and 9C. The first pipe element 184 is engaged with the ring seal 170 whereby an inner seal surface 122 on a lobe 123 of ring seal 170 contacts the sealing surface 199 extending circumferentially around pipe element 184. The ring seal 170 is then positioned within the channel 168 of the first segment 150 while the rim 188 is engaged with the first shoulder 160 within what will become the central space 154. Next the spring assembly 156 is formed by engaging the first end 175 of the first segment 150 with the first end 177 of the second segment 152. In the example shown, engagement of the first ends 175 and 177 is effected by joining a first boss 179 projecting from the first end 175 of the first segment 150 with a second boss 181 projecting from the first end 177 of the second segment 152 and pivotably linking them together using a link 183. In this example the link 183 comprises a ring 185 into which the bosses 179 and 181 are inserted, each boss having a respective head 187, 189 which retain the bosses within the ring 185 when the segments are pivoted into the preassembled state. As shown in FIG. 9C, the second boss 181 is contacted by a fulcrum 191 on the first boss 179, and the first boss 179 is contacted by a fulcrum 193 on the second boss 181. The bosses 179 and 181 joined by the ring 185 act as cantilever springs which bias the segments 150 and 152 away from one another and can also be used to support the segments in spaced apart relation, either alone or in combination with the ring seal 170 as described above. Next the second end 195 of the first segment 150 is attached to the second end 197 of the second segment 152 using the adjustable attachment assembly 158. In this example embodiment the adjustable attachment assembly comprises a first lug 201 mounted on the second end 195 of the first segment 150, a second lug 203 mounted on the second end 197 of the second segment 152, and a fastener 205 extending between the first and second lugs.

Working together with the spring assembly 156 (and/or the ring seal 170), initial tightening of the fastener 205 holds the segments 150 and 152 in the preassembled state shown in FIGS. 9A and 9C. In this configuration the segments 150, 152 are supported in spaced apart relation sufficient to permit the second pipe element 186 to be inserted into the central space 154 (see FIGS. 10-11) while also capturing the first pipe element 184 by engagement between the shoulder 160 and the rim 188. As shown in FIG. 9C, the projections 182 increase the ability of the segments 150, 152 to retain the first pipe element 184 when the combination 147 is in the preassembled state.

Figure 11:
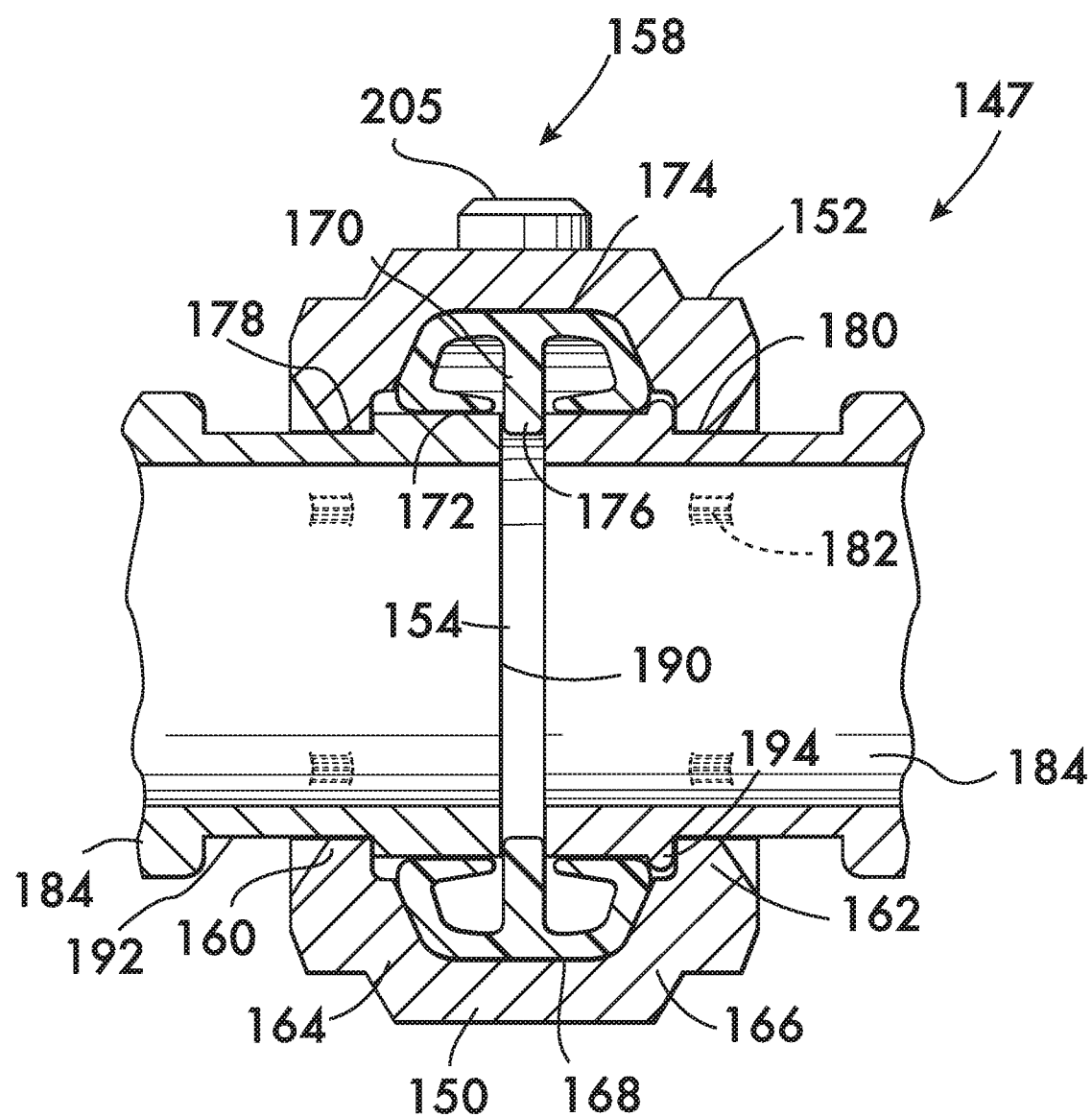

FIGS. 10 and 11 illustrate use of the combination 147 to join pipe elements 184 and 186. As shown in FIG. 10, with the combination 147 in the preassembled state the second pipe element 186 is inserted into the central space 154. Upon insertion the second pipe element 186 engages with surface 172 on the ring seal 170 (the first pipe element 184 is similarly engaged with the ring seal). As shown in FIG. 11, the segments are then drawn toward one another using the adjustable attachment assembly 158. In this example the fastener 205 is tightened, drawing the segments 150 and 152 against the biasing force of the spring assembly 156 (see FIG. 9C) and compressing the ring seal 170 to form a fluid tight joint. If projections 182 are present they engage the pipe elements 184, 186, otherwise, the arcuate surfaces 178 and 180 engage the pipe elements. FIG. 11 shows the arcuate surface 178 engaging a groove 192 in the second pipe element 186.

Figure 12:
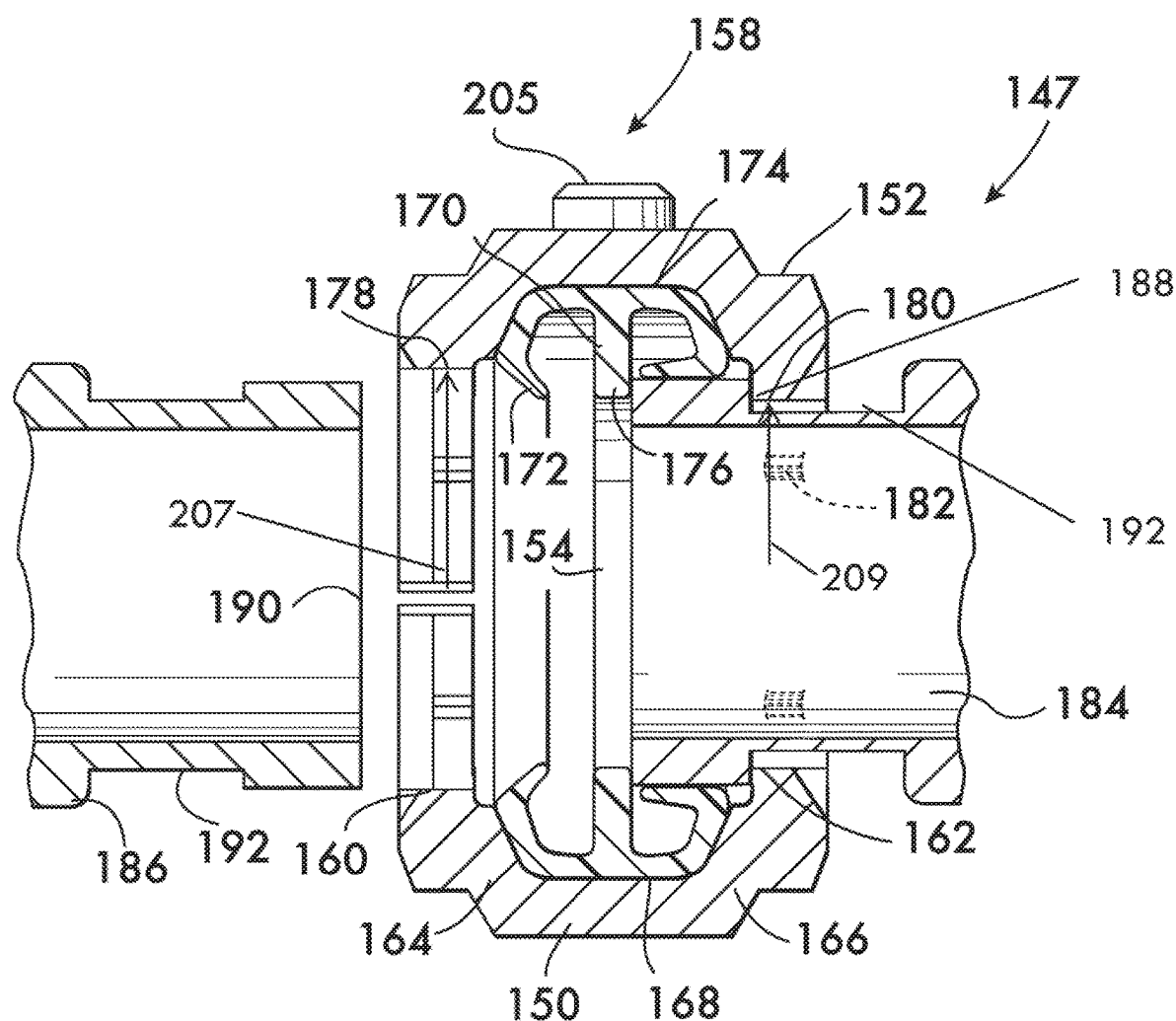
FIG. 12 is a sectional view of an example preassembled combination coupling and pipe element.

FIG. 12 shows an embodiment of the preassembled combination 147 wherein the first arcuate surface 178 has a first radius of curvature 207 and the second arcuate surface 180 has a second radius of curvature 209. In this example embodiment the second radius of curvature 209 is less than the first radius of curvature 207. This configuration of radii is appropriate when rim 188 of the first pipe element is defined by a groove 192 because it permits the first pipe element 184 to be captured by coupling 148 when it is in the preassembled state, while allowing the second pipe element 186 to be inserted into the central space 154 without disassembling the coupling. The groove 192 in the first pipe element 184 may be deeper than the groove 192 in the second pipe element 186 to accommodate this embodiment.

The use of the combination 147 having a single fastener 205 and a captured pipe element 184 provides significant advantage by increasing the stability of the coupling on the pipe elements through engagement between the coupling shoulder and the rim of the pipe element. The presence of the spring assembly and single fastener significantly inhibit the ability to manipulate the coupling by rocking it, making it much more difficult to separate the pipe element from the coupling. The single fastener also simplifies the tightening step, as only one fastener need be tightened, as opposed to two fasteners, which must be tightened in an alternating sequence to avoid damage to the ring seal.

Couplings according to the invention are expected to improve the efficiency of installation and the reliability of joints formed. Further expected advantages include a lighter weight coupling which has a lower external profile and which is smaller for a given pipe size. Having only one fastener reduces the part count and contributes to reduced errors during assembly, as well as eliminating the need to tighten more than one fastener in an alternating sequence.

What is claimed is:

1. A preassembled combination for connecting a captured pipe element to a second pipe element, the combination comprising:
   a preassembled coupling comprising:
      a plurality of segments attached to one another end to end to form a loop around a central space, each of said segments comprising a first shoulder, a second shoulder, and a channel disposed between the first and second shoulders and facing the central space, wherein the first and second shoulders project radially-inwardly toward the central space, and
      a flexible, resilient ring seal positioned in said channels, the ring seal comprising first and second lobes that each extend radially inwardly to define first and second ring inner seal surfaces, respectively; and the captured pipe element, wherein the captured pipe element comprises
    a first end disposed within the central space,
    a circumferentially extending sealing surface that is aligned with the first ring inner seal surface,
    an annular groove,
    a pipe shoulder extending radially-outwardly, and
    a bead extending radially-outwardly and disposed within the central space,
    wherein the annular groove, sealing surface, and bead are all axially disposed between the first end and the pipe shoulder,
    wherein the bead and sealing surface are both axially disposed between the annular groove and the first end,
    wherein the bead extends radially outwardly farther than an inner radial extent of the first lobe,
    wherein the coupling and bead are shaped and positioned such that the first end and bead are captured within the central space,
    wherein the second shoulders of the plurality of segments are axially disposed between the bead and pipe shoulder and are aligned with the annular groove of the captured pipe element,
    wherein the coupling is shaped and configured to permit an end of the second pipe element to be axially inserted into the central space, and
    wherein the coupling is shaped and configured such that once the end of the second pipe element is properly inserted into the central space, the plurality of segments can be drawn toward one another and the central space and thereby cause (1) the first ring inner seal surface to sealingly engage the sealing surface of the captured pipe element, (2) the second ring inner seal surface to sealingly engage a sealing surface of the second pipe element, (3) the second shoulders to engage the groove of the captured pipe element, and (4) the first shoulders to engage an annular groove of the second pipe element, thereby joining the second pipe element with the captured pipe element.

2. The combination of claim 1, wherein:
    the bead extends radially-outwardly from the sealing surface;
    the annular groove is axially disposed between the bead and pipe shoulder;
    the ring seal supports said segments in spaced apart relation sufficient to permit insertion of said second pipe element into said central space while said segments are attached to one another in the loop;
    engagement between the bead and the first lobe creates interference which acts to limit movement of said captured pipe element in a first axial direction;
    the pipe shoulder extends radially-outwardly farther than an inner radial extent of the second shoulders of the segments;
the sealing surface of the captured pipe element is positioned radially-outwardly farther than an annular bottom surface formed by the annular groove;
    the second ring inner seal surface has a diameter sized to receive said second pipe element upon insertion of the end of said second pipe element into the central space;
    said plurality of segments comprises no more than two said segments; and
    the coupling comprises a threaded fastener that connects a first of said plurality of segments to a second of said plurality of segments.

3. The combination of claim 1, wherein the bead extends radially-outwardly from the sealing surface.

4. The combination of claim 1, wherein the bead engages the first lobe.

5. The combination of claim 1, wherein the captured pipe element comprises a flexible hose.

6. The combination of claim 1, wherein the bead is axially spaced from the first end of the captured pipe element.

7. The combination of claim 1, wherein the annular groove is axially disposed between the bead and pipe shoulder.

8. The combination of claim 1, wherein the ring seal supports said segments in spaced apart relation sufficient to permit insertion of said second pipe element into said central space while said segments are attached to one another in the loop.

9. The combination of claim 1, wherein engagement between the bead and the first lobe creates interference which acts to limit movement of said captured pipe element in a first axial direction.

10. The combination of claim 9, wherein the first axial direction is a direction by which the captured pipe element moves further into the central space.

11. The combination of claim 1, wherein the sealing surface of the captured pipe element is positioned radially-outwardly farther than an annular bottom surface formed by the annular groove.

12. The combination of claim 1, wherein the pipe shoulder extends radially-outwardly farther than an inner radial extent of the second shoulders of the segments.

13. The combination of claim 12, wherein the pipe shoulder is axially adjacent to the annular groove and the second shoulders of the segments and limits an extent to which the first end of the captured pipe element can extend axially into the central space.

14. The combination of claim 1, wherein:
    said plurality of segments comprises no more than two said segments; and
    the coupling comprises a threaded fastener that connects a first of said plurality of segments to a second of said plurality of segments.

15. The combination of claim 1, further comprising the second pipe element, wherein the end of the second pipe element is disposed within the central space.

16. The combination of claim 1, wherein the bead is axially disposed between the sealing surface of the captured pipe element and the groove of the captured pipe element.

17. The combination of claim 1, wherein a diameter of said first ring inner seal surface is substantially the same as a diameter of said captured pipe element local to said sealing surface of said captured pipe element, and a diameter of said second ring inner seal surface is substantially the same as a diameter of said second pipe element local to said sealing surface of said second pipe element.

18. The combination of claim 1, wherein said captured pipe element is connectable to said second pipe element in facing end to end relation.

19. The combination of claim 18, where at least one of said captured pipe element and said second pipe element engages a pipe stop within said central space.

20. The combination of claim 1, wherein said first shoulder of said coupling assembly has a first diameter and said second shoulder of said coupling assembly has a second diameter substantially equal to said first diameter.

21. The combination of claim 1, wherein the preassembled combination comprises a pipe stop that prevents the second pipe element from being inserted into the central space axially past the first end of the captured pipe element.

22. The combination of claim 21, wherein the pipe stop is formed by the resilient ring seal.

23. The combination of claim 1, wherein the preassembled combination comprises a pipe stop that prevents the second pipe element from being inserted into the central space so far that the second pipe element extends axially past the central space.

24. The combination of claim 1, wherein the sealing surface of the captured pipe element comprises a cylinder shape.

25. The combination of claim 24, wherein the sealing surface of the second pipe element is cylindrically-shaped, and wherein the second ring inner seal surface is shaped and configured to engage the sealing surface of the second pipe element when the second pipe element is inserted into the central space.

26. A method of manufacturing the combination of claim 1, the method comprising, sequentially:
engaging the ring seal with a pipe element that will become the captured pipe element such that (1) interference between the bead and the first lobe impedes movement of said captured pipe element relative to the ring seal in a first axial direction, and (2) first ring inner seal surface is axially aligned with the sealing surface of the captured pipe element;
positioning the ring seal in the channel of at least one of the plurality of segments; and
attaching the plurality of segments to one another end to end to form the loop around the central space, thereby forming the preassembled coupling and capturing the captured pipe element within the central space to form the combination.

27. The method of claim 26, wherein said attaching comprises partially tightening a threaded fastener that extends between two of the plurality of segments.

28. The method of claim 27, wherein:
the sealing surface of the second pipe is axially disposed between the annular groove of the second pipe and the end of the second pipe; and
the annular groove of the second pipe element is axially adjacent the sealing surface of the second pipe element; and
the sealing surface of the second pipe element is axially adjacent the end of the second pipe element.

29. The method of claim 26, wherein said attaching causes the ring seal to support said segments in spaced apart relation sufficient to permit insertion of the end of the second pipe element into said central space while said segments are attached to one another in the loop.

30. A method of using the combination in claim 1, the method comprising:
axially inserting the end of the second pipe element into the central space while the coupling is preassembled and the first end of the captured pipe element is captured within the central space; and
while the end of the second pipe element is inserted into the central space, drawing the plurality of segments toward one another and the central space, thereby causing (1) the first ring inner seal surface to sealingly engage the sealing surface of the captured pipe element, (2) the second ring inner seal surface to sealingly engage the sealing surface of the second pipe element, (3) the second shoulders to engage the groove of the captured pipe element, and (4) the first shoulders to engage the annular groove of the second pipe element, thereby joining the second pipe element with the captured pipe element.

31. The method of claim 30, wherein said drawing comprises tightening a threaded fastener that extends between two of the plurality of segments.

32. The method of claim 30, wherein the sealing surface of the second pipe element is the radially-outwardmost surface of the second pipe element between the annular groove of the second pipe element and the end of the second pipe element.

33. The method of claim 32, wherein an outer surface of the second pipe is disposed on an opposite side of the annular groove from the sealing surface of the second pipe extends radially-outwardly farther than the sealing surface of the second pipe.

34. The method of claim 30, wherein, after said drawing, the sealing surface of the second pipe element defines a radially-outwardmost surface of the portion of the second pipe element disposed within the central space.

35. The method of claim 30, wherein the bead of the captured pipe element is positioned radially outwardly farther than the sealing surface of the second pipe element.

36. The method of claim 30, wherein, after said drawing, a portion of the captured pipe element disposed in the central space extends radially outwardly farther than a portion of the second pipe element disposed in the central space.

37. The method of claim 30, wherein, after said drawing, the bead causes a shape of a portion of the captured pipe element disposed within the central space to be different from a shape of a portion of the second pipe element disposed within the central space.

38. The method of claim 30, wherein the sealing surface of the second pipe element extends continuously to the end of the second pipe element.

39. The method of claim 38, wherein the sealing surface of the second pipe element extends continuously from the annular groove of the second pipe element to the end of the second pipe element.

* * * * *